US007290860B2

(12) United States Patent
Maher et al.

(10) Patent No.: US 7,290,860 B2
(45) Date of Patent: Nov. 6, 2007

(54) METHODS OF FABRICATING NOZZLE PLATES

(75) Inventors: Colin G. Maher, Georgetown, KY (US); James H. Powers, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 272 days.

(21) Appl. No.: 10/925,675

(22) Filed: Aug. 25, 2004

(65) Prior Publication Data

US 2006/0044349 A1 Mar. 2, 2006

(51) Int. Cl.
*B41J 2/14* (2006.01)
*B41J 2/16* (2006.01)
*B23K 26/38* (2006.01)

(52) U.S. Cl. .................................... 347/47; 219/121.71

(58) Field of Classification Search .................. 347/45, 347/47; 219/121.69, 121.71
See application file for complete search history.

(56) References Cited

U.S. PATENT DOCUMENTS 5,227,098 A 7/1993 Philby et al.
5,312,517 A 5/1994 Ouki
5,697,144 A * 12/1997 Mitani et al. ................. 347/65
5,855,835 A 1/1999 Gordon et al.
5,948,289 A 9/1999 Noda et al.
6,183,078 B1 2/2001 Pietrzyk et al.
6,203,145 B1 3/2001 Jeanmaire et al.
6,209,203 B1 4/2001 Murthy et al.
6,527,369 B1 * 3/2003 Weber et al. ................. 347/47
6,557,974 B1 5/2003 Weber
6,623,103 B2 9/2003 Maher et al.
6,627,844 B2 9/2003 Liu et al.
6,860,587 B2 * 3/2005 Torgerson et al. ............ 347/43
6,922,203 B2 7/2005 Giere et al.
7,036,909 B2 * 5/2006 Kubota et al. ................ 347/47
7,152,951 B2 * 12/2006 Maher et al. ................. 347/47
7,169,538 B2 * 1/2007 Bertelsen et al. ............. 347/47
2005/0088486 A1 * 4/2005 Goin et al. ................... 347/47

OTHER PUBLICATIONS

International Search Report and Written Opinion of the International Searching Authority for International Application No. PCT/US05/30192, Oct. 25, 2006, U.S. Patent and Trademark Office.

* cited by examiner

*Primary Examiner*—Geoffrey S. Evans
(74) *Attorney, Agent, or Firm*—Luedeka, Neely & Graham PC

(57) ABSTRACT

A method of making flow feature structures for a micro-fluid ejection head. The method includes the steps of laser ablating a nozzle plate material to provide an elongate fluid chamber and fluid supply channel therein for connecting the fluid chamber with a fluid supply. The fluid chamber has a first length and a first width. An elongate nozzle hole is laser ablated in the nozzle plate material co-axial with the fluid chamber. The nozzle hole has entrance dimensions having a longitudinal axis dimension and a transverse axis dimension such that the longitudinal axis dimension is from about 1.1 to about 4.0 times the transverse axis dimension.

17 Claims, 9 Drawing Sheets

METHODS OF FABRICATING NOZZLE PLATES

FIELD OF THE DISCLOSURE

The disclosure relates to micro-fluid ejection device structures and in particular to methods of manufacturing improved nozzle plates for micro-fluid ejection devices.

BACKGROUND

Micro-fluid ejection devices continue to be used in a wide variety of applications, including ink jet printers, medical delivery devices, micro-coolers and the like. Of the uses, ink jet printers provide, by far, the most common use of micro-fluid ejection devices. Ink jet printers are typically more versatile than laser printers for some applications. As the capabilities of ink jet printers are increased to provide higher quality images at increased printing rates, fluid ejection heads, which are the primary printing components of ink jet printers, continue to evolve and become more complex.

Improved print quality requires that the ejection heads provide an increased number of ink droplets. In order to increase the number of ink droplets from an ejection head, ejection heads are designed to include more nozzles and corresponding ink ejection actuators. The number of nozzles and actuators for a "top shooter" or "roof shooter" ejection head can be increased in several ways known to those skilled in the art. For example, in an integrated nozzle plate containing nozzle holes, ink chambers, and ink channels laser ablated in a polyimide material, adjacent nozzles and corresponding ink chambers are typically offset from one another in a direction orthogonal to the ink feed slot. With a laser ablated nozzle plate containing ink chambers and ink channels, a minimum spacing between adjacent ink chambers is required to provide sufficient chamber wall structure for the ink chambers. Hence, a longer nozzle plate and corresponding semiconductor substrate is required as the number of nozzles and actuators for the ejection head is increased. However, the trend is toward providing narrower substrates and corresponding nozzle plates having greater functionality. A reduction in size results in increased production time due to tolerances required for such ejection heads.

Accordingly, there continues to be a need for smaller ejection heads having increased functionality and means for reducing production time for making such ejection heads.

SUMMARY OF THE INVENTION

With regard to the foregoing and other objects and advantages there is provided a method of making flow feature structures for a micro-fluid ejection head. The method includes the steps of laser ablating a nozzle plate material to provide an elongate fluid chamber and fluid supply channel therein for connecting the fluid chamber with a fluid supply. The fluid chamber has a first length and a first width. An elongate nozzle hole is laser ablated in the nozzle plate material co-axial with the fluid chamber. The nozzle hole has entrance dimensions having a longitudinal axis dimension and a transverse axis dimension such that the longitudinal axis dimension is from about 1.1 to about 4.0 times the transverse axis dimension.

In another embodiment there is provided a nozzle plate for a micro-fluid ejection head. The nozzle plate includes a substantially linear array of nozzle holes in a nozzle plate. The nozzle holes are axially aligned with fluid chambers for ejecting fluid through the nozzle holes. Each fluid chamber has a first width and a first length and each nozzle hole has an entrance having a longitudinal axis dimension and a transverse axis dimension. The longitudinal axis dimension ranges from about 1.1 to about 4.0 times the transverse axis dimension, and the longitudinal axis dimension is less than the first length.

An advantage of the disclosure is that it provides ejection heads having increased functionality without increasing the size of the ejection head components. The disclosure also enables production of ejection heads having a nozzle pitch of greater than 600 dpi without the need to provide adjacent nozzles and corresponding ink chambers that are offset from one another in a direction orthogonal to a fluid feed slot.

For purposes of this invention, the term "pitch" as it is applied to nozzles or fluid ejection actuators is intended to mean a center to center spacing between adjacent nozzles or fluid chambers in a direction substantially parallel with an axis aligned with a columnar nozzle array disposed in a linear direction along a fluid feed slot.

BRIEF DESCRIPTION OF THE DRAWINGS

Further advantages of the disclosed embodiments will become apparent by reference to the detailed description of exemplary embodiments when considered in conjunction with the following drawings illustrating one or more non-limiting aspects of the embodiments, wherein like reference characters designate like or similar elements throughout the several drawings as follows.

DETAILED DESCRIPTION OF THE EXEMPLARY EMBODIMENTS

Figure 1:
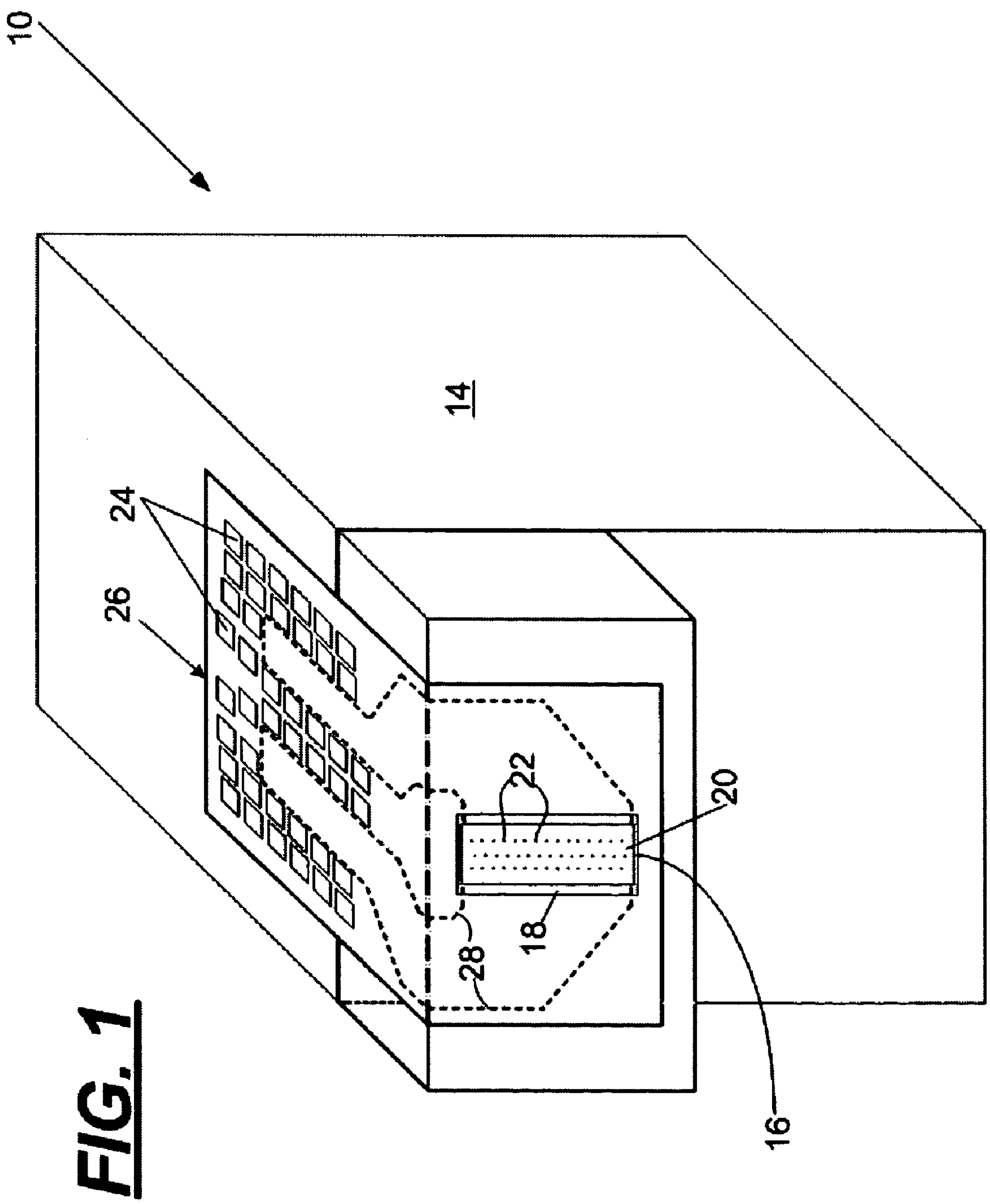
FIG. 1 is a perspective view, not to scale, of a fluid cartridge containing a micro-fluid ejection head.

With reference to FIGS. 1, a micro-fluid ejection cartridge 10 containing a micro-fluid ejection head 16 is illustrated. The cartridge 10 includes a cartridge body 14 for supplying a fluid such as ink to the ejection head 16. The fluid may be contained in a storage area in the cartridge body 14 or may be supplied from a remote source to the cartridge body 14.

The micro-fluid ejection head 16 includes a semiconductor substrate 18 and a nozzle plate 20 containing nozzle holes 22 attached to the substrate 18. In the alternative, a nozzle plate containing nozzle holes and flow features may be attached to a thick film layer on the substrate. Electrical contacts 24 are provided on a flexible circuit 26 for electrical connection to a device for controlling fluid ejection actuators on the ejection head 16. The flexible circuit 26 includes electrical traces 28 that are connected to the substrate 18 of the printhead 16.

Figure 2:
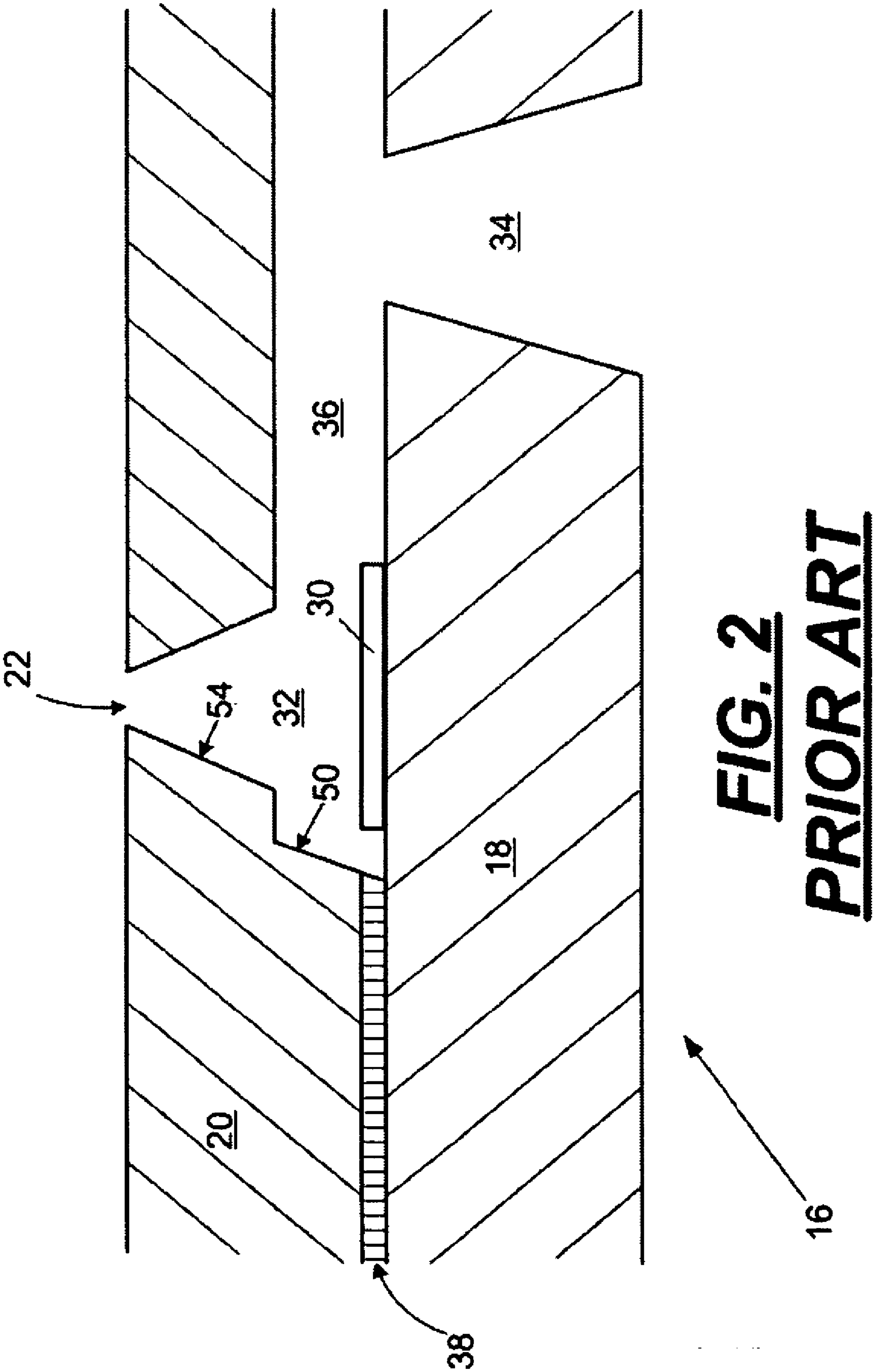
FIG. 2 PRIOR ART
FIGS. 2 and 3 are cross-sectional views, not to scale, of portions of prior art micro-fluid ejection heads.

An enlarged cross-sectional view, not to scale, of a portion of a prior art ejection head 16 is illustrated in FIG. 2. The ejection head 16 contains a thermal heating element 30 for heating a fluid in a fluid chamber 32 formed by ablating a portion of the nozzle plate 20. However, the disclosure is not limited to an ejection head 16 containing a thermal heating element 30. Other fluid ejection actuators, such as piezoelectric devices may also be used to provide an ejection head according to the disclosure.

Figure 3:
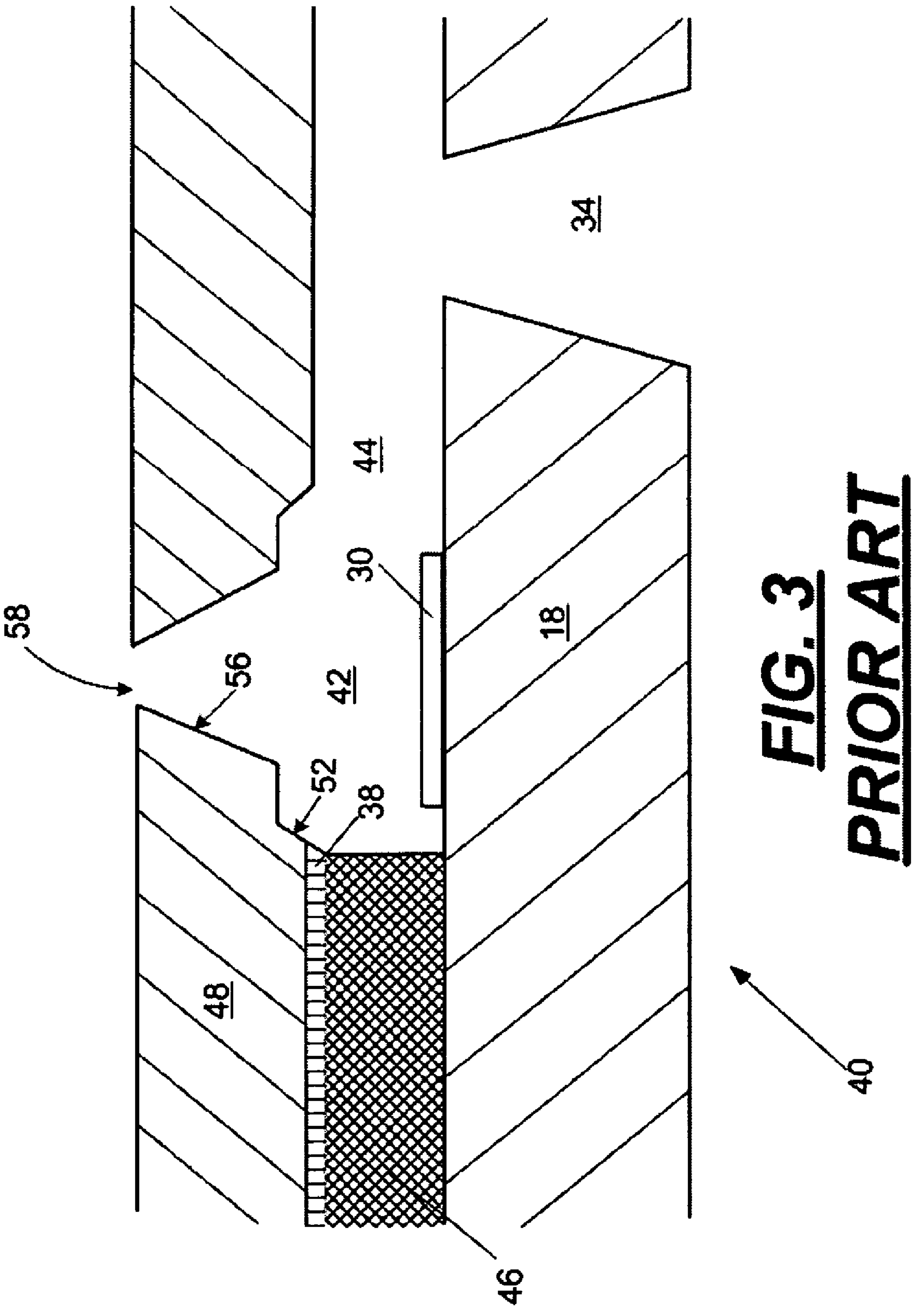
FIG. 3 PRIOR ART

Fluid for ejection through nozzle holes 22 is provided to the fluid chamber 32 through an opening or fluid supply slot 34 in the substrate 18 and subsequently through a fluid supply channel 36 connecting the slot 34 with the fluid chamber 32. Like the fluid chamber 32, the fluid supply channel 36 is laser ablated in the nozzle plate 20. The nozzle plate 20 is preferably adhesively attached to the substrate 18 as by adhesive layer 38. In another prior art design of an ejection head 40 (FIG. 3), a fluid chamber 42 and fluid supply channel 44 are provided by a combination of a thick film layer 46 and a laser ablated nozzle plate 48.

As set forth above, at least a portion of the fluid chamber 32 or 42 and fluid supply channel 36 or 44 are formed in the nozzle plate 20 or 48 as by laser ablation. Laser ablation of the nozzle plate 20 or 48 is typically conducted from the fluid chamber 32 or 42 side of the nozzle plate 20 or 48. When the nozzle plate 20 or 48 is made of a polyimide material, walls 50 or 52 of the fluid chamber 32 or 42 and walls 54 or 56 of the nozzle 22 or 58 have sloping or angled surfaces due to the laser ablation process. Typically, chamber walls 54 or 56 have an ablation taper angle of 5 to 18 degrees through the thickness of the nozzle plate 20 or 48. Accordingly, about 17 microns is required between an entrance of the fluid chamber 32 or 42 and an exit of the nozzle 22 or 58.

Figure 4:
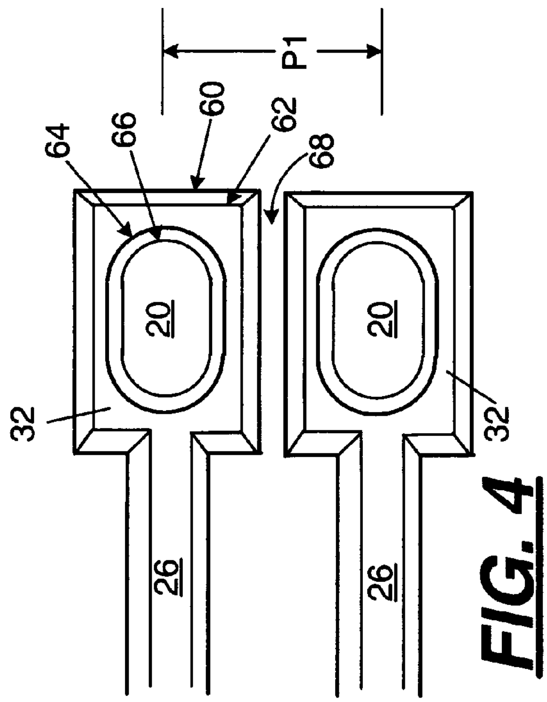
FIG. 4 PRIOR ART

A plan view of the fluid chamber 32 and nozzle hole 22 of ejection head 16 is illustrated in FIG. 4. In FIG. 4, a chamber entrance 60 and a chamber exit 62 are shown. Likewise a nozzle entrance 64 and a nozzle exit 66 are shown. With the laser ablated nozzle plate 20 or 48 illustrated in FIGS. 2-4, a minimum center to center spacing P1 between adjacent nozzles 20 is required to provide a sufficient thickness of wall 68 between adjacent fluid chambers 32 in order to provide a robust fluidic seal between adjacent fluid chambers 32. The thickness of wall 68 between adjacent fluid chambers 32 typically ranged from about 7.5 to about 30 microns, considering manufacturing alignment tolerances. Accordingly, the center to center spacing P1 between adjacent nozzles 20 was typically about 42 microns or more to provide a pitch of less than about 600 dpi (dots per inch). The larger the pitch, the larger the nozzle plate 20 or 48 and substrate 18 required for fluid ejection actuators 30.

Figure 5:
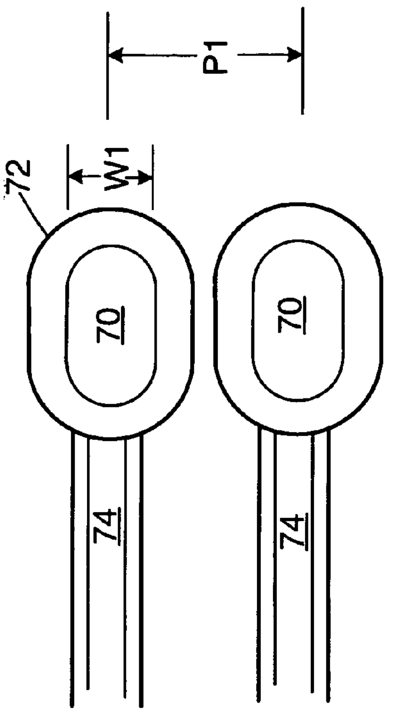
FIG. 5 PRIOR ART
FIGS. 4 and 5 are plan view, not to scale of portions of prior art nozzle plates.

FIG. 5 illustrates an attempt to reduce a spacing P2 between adjacent nozzles 70. In this case, the nozzle entrance and chamber entrance 72 were the same. However, a process for making such a nozzle 70 and fluid chamber required a longer processing time. In the process, the nozzles 70 were ablated first through the thickness of the nozzle plate material. A second ablation step was then performed to ablate the fluid supply channels 74. Accordingly, the nozzle plate material required x pulses to ablate completely through the nozzle plate material to form the nozzles 70. The nozzle plate material was then partially ablated with a fraction, k, of x pulses, kx, to provide the fluid supply channels 74. Thus a total of x+kx pulses was required to provide a completely ablated nozzle plate.

Figure 7:
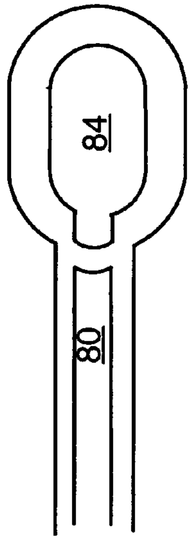
FIG. 7 PRIOR ART
FIG. 7 is a plan view, not to scale, of a portion of a prior art nozzle plate made by a prior art process.
Figure 6:
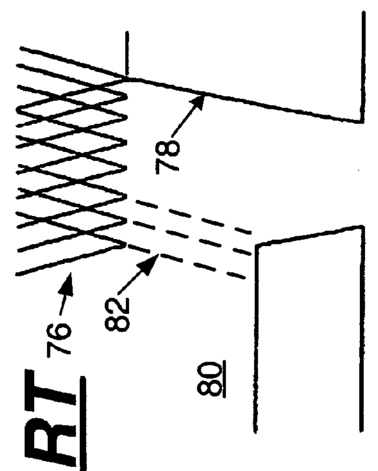
FIG. 6 PRIOR ART
FIG. 6 is a cross-sectional view, not to scale, of a portion of a prior art nozzle plate during a laser ablation process.

An attempt to ablate the fluid supply channels first 74 for the nozzles 70 (FIG. 5) produces undesirable results as shown in FIGS. 6 and 7. As shown in FIG. 6, an incoming laser beam 76 will reflect off of chamber and nozzle wall 78 opposite a fluid channel 80. However the incoming laser beam 76 has no such wall to reflect off of in the fluid channel 80. The dotted lines 82 represent the laser beams that do not reflect off of a wall in the fluid channel 80 area. Accordingly, fluid channel 80 and nozzle 84 are ablated in the nozzle plate to produce a configuration illustrated in plan view in FIG. 7 which is undesirable. The asymmetric defect shown in FIG. 7 of the nozzle hole 84 causes fluid ejected from the nozzle hole 84 to be misdirected.

Figure 8:
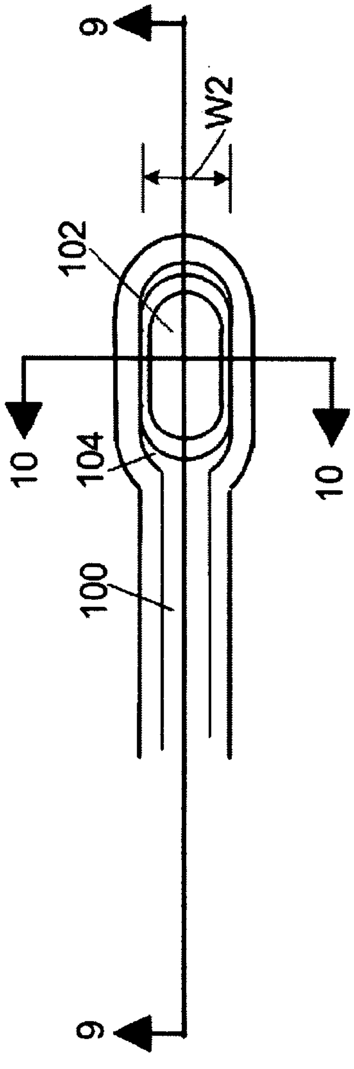
FIG. 8 is a plan view, not to scale, of a portion of a nozzle plate made according to one embodiment of the disclosure.
Figure 10:
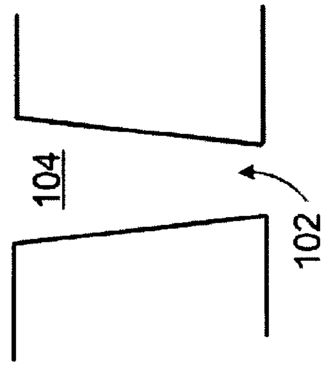
FIGS. 9 and 10 are cross-sectional views, not to scale, of the portion of the nozzle plate of FIG. 8.
Figure 9:
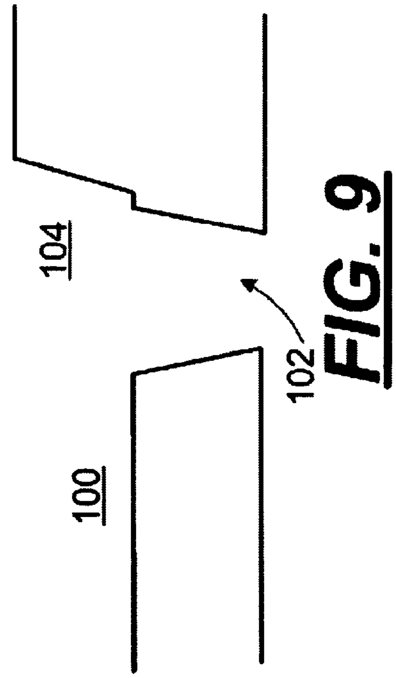
Figure 11:
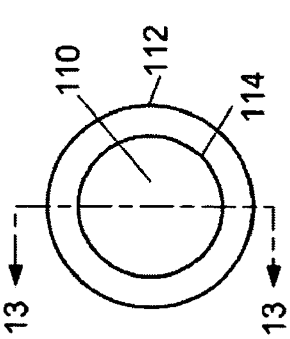
FIG. 11 PRIOR ART
FIG. 11 is a plan view, not to scale, of a nozzle hole in a prior art nozzle plate.

A method for reducing the defects caused by ablating a fluid supply channel 100 before a nozzle hole 102 is illustrated in FIGS. 8-10. According to this embodiment, the fluid chamber 104 is elongated while maintaining a width W2 of the chamber 104 the same as a chamber width W1 in FIG. 5. Elongating the length of chamber 104 enables ablating to occur equally on both ends of the chamber 104 as shown in FIG. 9. The width W2 of the chamber 104 substantially matches a nozzle entrance width as shown in cross-sectional view in FIG. 10. In this embodiment, the nozzle 102 is ablated after ablating the fluid chamber 104 and fluid supply channel 100 whereby the process only requires x laser beam pulses to form all of the flow features in a nozzle plate material. The foregoing process also enables a center to center spacing between adjacent fluid chambers 104 of less than 42 microns providing a pitch of greater than about 600 dpi up to about 1200 dpi.

In another embodiment, the disclosure provides a method for improving a process for laser ablating nozzle plates for micro-fluid ejection devices. The process improvement is selected from reducing a number of laser pulses required, reducing an amount of wall angle taper between an entrance to a fluid chamber and a nozzle exit, or both. "Wall angle taper" is defined as a difference in width between an entrance of a fluid chamber and an exit of a corresponding nozzle. By decreasing the wall angle taper, the pitch or linear packing density of fluid chambers and nozzles may be increased.

Figure 12:
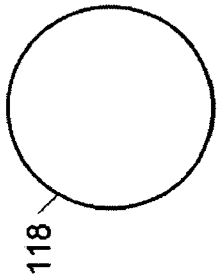
FIG. 12 PRIOR ART
FIG. 12 is a plan view, not to scale, of a mask for ablating the nozzle hole of FIG. 11.
Figure 13:
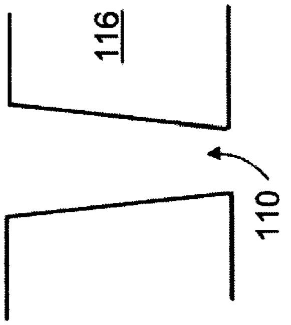
FIG. 13 PRIOR ART
FIG. 13 is a cross-sectional view, not to scale, of the nozzle hole of FIG. 11.

Processes for ablating nozzles and fluid chambers according to prior art processes are illustrated in FIGS. 11-16. According to a first process, a nozzle hole 110 having an entrance perimeter 112 and an exit perimeter 114 is first laser ablated in a nozzle plate 116 using a mask 118 (FIG. 12). A cross-sectional view of the nozzle hole 110 is illustrated in FIG. 13. The thickness of the nozzle plate is about 63 microns. At a frequency of 250 Hz, it takes about 1.12 seconds to ablate through 63 microns thickness of nozzle plate 116 to form the nozzle hole 110.

Figure 14:
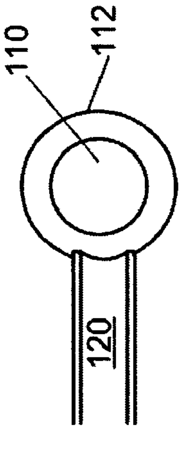
FIG. 14 PRIOR ART
FIG. 14 is a plan view, not to scale, of a fluid supply channel and nozzle hole made by a prior art process.
Figure 15:
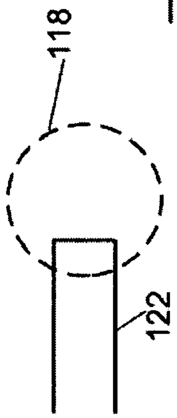
FIG. 15 PRIOR ART
FIG. 15 is a plan view, not to scale, of a mask for making the fluid supply channel by the prior art process of FIG. 14.
Figure 16:
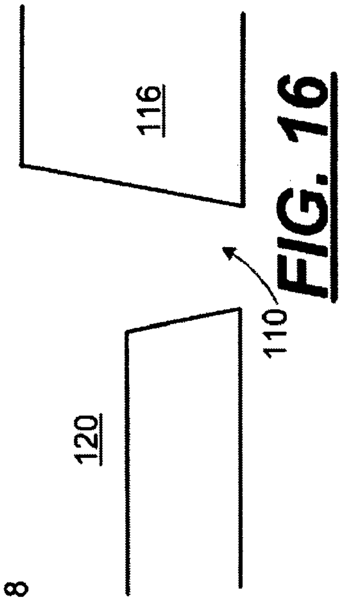
FIG. 16 PRIOR ART
FIG. 16 is a cross-sectional view, not to scale, of a nozzle plate made by the prior art process of FIGS. 14 and 15.

Next a fluid supply channel 120 (FIG. 14 is laser ablated in the nozzle plate 116 using a mask 122 (FIG. 15) to provide flow features in the nozzle plate 116 as shown in FIG. 16. The fluid supply channel is ablated partially through the thickness of the nozzle plate 116 to a depth of 26 microns at a frequency of 80 Hz. Accordingly, the flow features are ablated in about 1.15 seconds. The total time required to ablate the nozzle 110 and fluid supply channel 120 is about 2.27 seconds.

Figure 19:
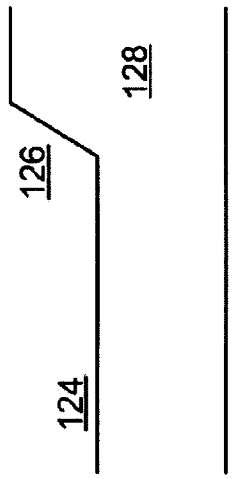
FIG. 19 is a cross-sectional view, not to scale of a portion of a nozzle plate made using the mask of FIG. 18.
Figure 18:
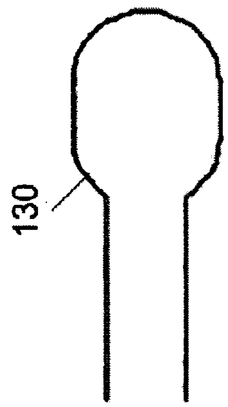
FIG. 18 is a plan view, not to scale, of a mask for making the fluid supply channel and fluid chamber of FIG. 17.
Figure 17:
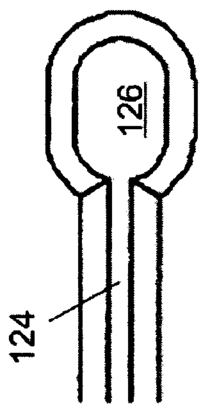
FIG. 17 is a plan view, not to scale, of a portion of a nozzle plate containing a fluid supply channel and fluid chamber made according to an embodiment of the disclosure.
Figure 20:
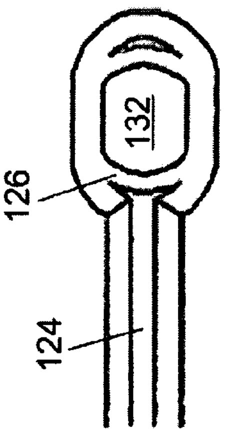
FIG. 20 is a plan view, not to scale, of a nozzle hole for the nozzle plate of FIG. 19.

In one embodiment of the disclosure, a fluid supply channel 124 and fluid chamber 126 (FIG. 17) are first ablated in a nozzle plate 128 (FIG. 19) using a mask 130 (FIG. 18). In this case, the nozzle plate 128 is again about 63 microns thick, and the flow features (fluid supply channel 124 and fluid chamber 126) are ablated a depth of 26 microns through the nozzle plate 128 at a frequency of 80 Hz. Ablation of the nozzle plate 128 to this depth takes 1.15 seconds.

Figure 22:
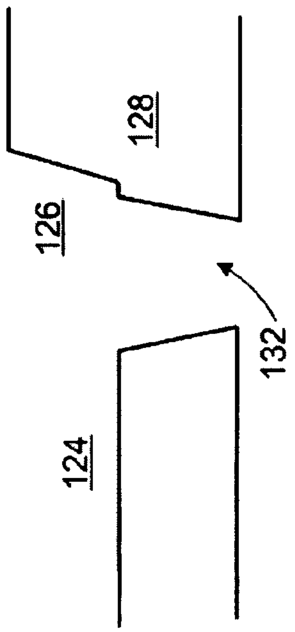
FIG. 22 is a cross-sectional view, not to scale, of a portion of a nozzle plate made using the masks of FIGS. 18 and 21.
Figure 21:
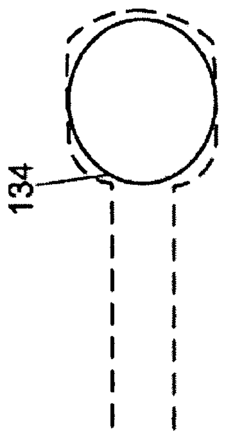
FIG. 21 is a plan view, not to scale, of a mask for making a nozzle hole according to FIG. 20.

Next, a nozzle hole 132 (FIG. is laser ablated through the remaining thickness of the nozzle plate 128, i.e., 37 microns, using a mask 134 (FIG. 21) to provide the nozzle plate 128 shown in cross-sectional view in FIG. 22. It takes about 0.75 seconds to ablate the nozzle hole 132 through the remaining thickness of the nozzle plate 128 at a frequency of 250 Hz. Accordingly, the total time required for forming the flow features and nozzle hole 132 according to the disclosure is 1.9 seconds or about 15 to 16 percent faster than with the prior art method FIGS. 11-16.

Figure 23:
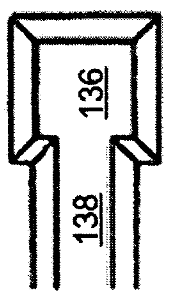
FIG. 23 PRIOR ART
FIG. 23 is a plan view, not to scale, of a fluid supply channel and fluid chamber made by a prior art process.
Figure 24:
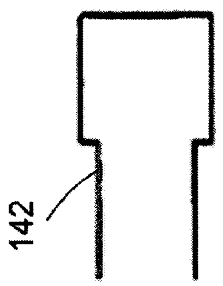
FIG. 24 PRIOR ART
FIG. 24 is a plan view, not to scale, of a mask for making the fluid supply channel and fluid chamber by the prior art process of FIG. 23.
Figure 25:
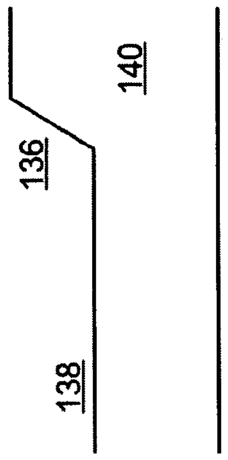
FIG. 25 PRIOR ART
FIG. 25 is a cross-sectional view, not to scale, of a portion of a prior art nozzle plate containing the fluid chamber and fluid supply channel of FIG. 23.
Figure 26:
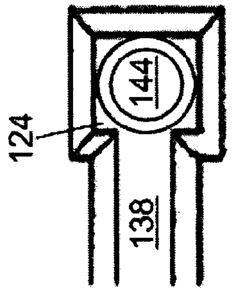
FIG. 26 PRIOR ART
FIG. 26 is a plan view, not to scale, a prior art nozzle hole for the fluid chamber and fluid supply channel of FIG. 23.

In another embodiment of the disclosure, a fluid chamber is elongated as compared to a conventional fluid chamber design so that the pitch of fluid chambers can be increased. A prior art process for flow features and nozzle holes is illustrated in FIGS. 23-28. With reference to FIG. 23, a fluid chamber 136 fluid channel 138 (FIG. 23) are first laser ablated in a nozzle plate 140 (FIG. 24) using a mask 142 (FIG. 25) which provides a substantially square fluid chamber 136. In this case, the nozzle plate 140 has a thickness of about 38 microns. The fluid chamber 136 and fluid channel 138 are laser ablated at a frequency of 80 Hz to a depth of 18 microns. Laser ablation of the flow features takes about 0.65 seconds.

Figure 27:
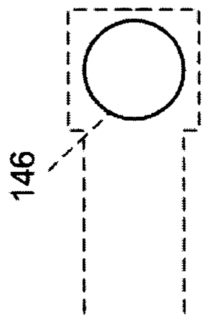
FIG. 27 PRIOR ART
FIG. 27 is a plan view, not to scale, of a mask for making the nozzle hole FIG. 26.
Figure 28:
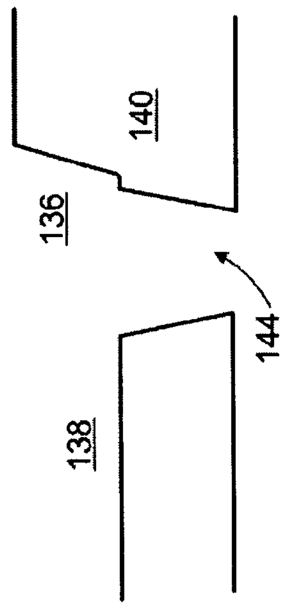
FIG. 28 PRIOR ART
FIG. 28 is a cross-sectional view, not to scale of a portion of a prior art nozzle plate made using the masks of FIGS. 24 and 27.

Next, a nozzle hole 144 (FIG. 26) is laser ablated through the remaining thickness of the nozzle plate 140 of 20 microns in about 0.4 seconds at a frequency of 250 Hz using mask 146 (FIG. 27). The resulting nozzle plate 140 is illustrated in FIG. 28. Using the foregoing process and chamber 136 design, the minimum chamber width is about 31 microns.

Figure 29:
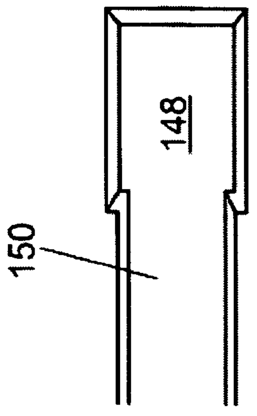
FIG. 29 is a plan view, not to scale, of a fluid supply channel and fluid chamber according to another embodiment of the disclosure.
Figure 30:
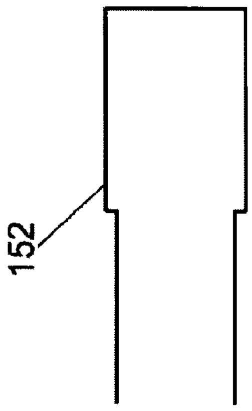
FIG. 30 is a plan view, not to scale, of a mask for making the fluid supply channel and fluid chamber according to FIG. 29.
Figure 31:
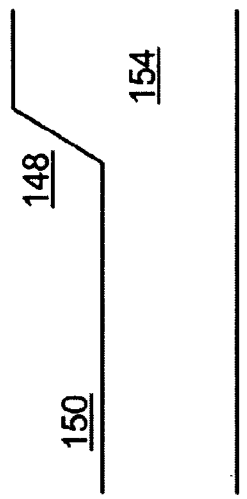
FIG. 31 is a cross-sectional view, not to scale, of a portion of a nozzle plate made using the mask of FIG. 30.

However, according to another embodiment of the disclosure, the chamber width may be reduced so that the pitch may be increased. FIGS. 29-34 illustrate a process according to this embodiment of the disclosure. With reference to FIG. 29, an elongate fluid chamber 148 and fluid supply channel 150 (FIG. 29) are first ablated in a nozzle plate 154 (FIG. 31) using a mask 152 (FIG. 30). "Elongate" means that a length of the fluid chamber 148 is greater than a width of the fluid chamber 148. As before, the fluid supply channel 150 and fluid chamber 148 are ablated before ablating a nozzle hole 156 in the nozzle plate 154.

Figure 32:
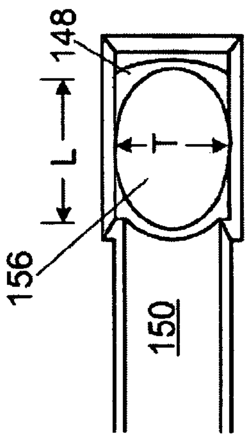
FIG. 32 is a plan view, not to scale, of a nozzle hole in the fluid chamber of FIG. 29.
Figure 33:
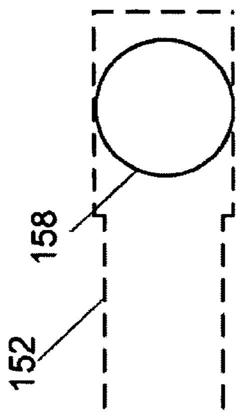
FIG. 33 is a plan view, not to scale, of a mask for making the nozzle hole of FIG. 32.
Figure 34:
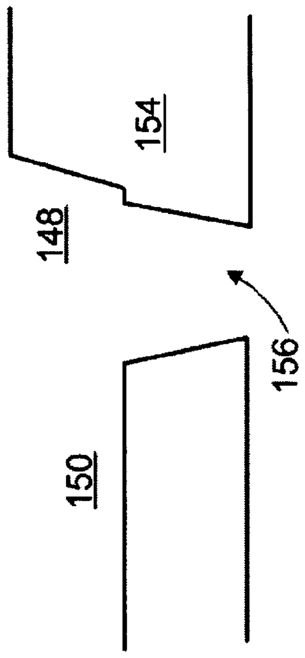
FIG. 34 is a cross-sectional view, not to scale, of a portion of a nozzle plate made using the masks of FIGS. 30 and 33.

Next, a nozzle hole 156 is ablated in the nozzle plate 154 (FIG. 32) using a mask 158 (FIG. 33). While the mask 158 is substantially circular, the resulting nozzle hole 156 is substantially oblong so that the nozzle hole 156 has a longitudinal axis dimension L and a transverse axis dimension T wherein L is greater than T. Typically, the longitudinal axis L is ranges from about 1.1 to about 4.0 times the transverse axis T. As shown in FIGS. 32 and 34 a width of the nozzle hole 156 entrance is substantially the same as a width of the fluid chamber 148 exit. Accordingly, the foregoing process enables a greater pitch of fluid chambers 148 as compared to a prior art process illustrated in FIGS. 23-28.

While the foregoing embodiments have been described in terms of a nozzle plate or a nozzle plate and thick film layer, it will be appreciated that the ink chambers and ink channels may be formed exclusively in either the nozzle plate or thick film layer, or may be formed in both the nozzle plate and thick film layer.

It is contemplated, and will be apparent to those skilled in the art from the preceding description and the accompanying drawings, that modifications and changes may be made in the embodiments described herein. Accordingly, it is expressly intended that the foregoing description and the accompanying drawings are illustrative of exemplary embodiments only, not limiting thereto, and that the true spirit and scope of the present embodiments be determined by reference to the appended claims.

What is claimed is:

1. A method of making flow feature structures for a micro-fluid ejection head, the method comprising the steps of:

laser ablating a nozzle plate material to provide an elongate fluid chamber and fluid supply channel therein for connecting the fluid chamber with a fluid supply, the fluid chamber having a first length and a first width; and laser ablating an elongate nozzle hole in the nozzle plate material co-axial with the first length of the fluid chamber, wherein the nozzle hole has entrance dimensions having a longitudinal axis dimension and a transverse axis dimension such that the longitudinal axis dimension is from about 1.1 to about 4.0 times the transverse axis dimension, and the longitudinal axis dimension ranges from about two to about six microns shorter than the first length of the fluid chamber.

2. The method of claim 1, wherein the nozzle hole is ablated subsequent to ablating the fluid chamber and fluid supply channel.

3. The method of claim 1, wherein a number of laser pulses required for making the flow feature structures is less than a number of pulses required for making the flow feature structures when the fluid chamber and fluid supply channel are ablated subsequent to ablating the nozzle hole.

4. The method of claim 1, wherein the transverse axis dimension ranges from about 0 to about 7 microns less than the first width of the fluid chamber.

5. The method of claim 1, wherein the nozzle hole has a bicircular exit shape.

6. A nozzle plate for a micro-fluid ejection head, the nozzle plate comprising a substantially linear array of nozzle holes ablated in a nozzle plate, the nozzle holes being axially aligned with fluid chambers for ejecting fluid through the nozzle holes, wherein each fluid chamber has a first width and a first length and each nozzle hole has an entrance having a transverse axis dimension and a longitudinal axis dimension along a longitudinal axis coaxial with the first length of the fluid chamber, wherein the longitudinal axis dimension ranges from about 1.1 to about 4.0 times the transverse axis dimension, and wherein the longitudinal axis dimension ranges from about two to about six microns shorter than the first length of the fluid chamber.

7. The nozzle plate of claim 6, wherein the nozzle plate has a nozzle pitch of greater than 600 dpi.

8. The nozzle plate of claim 6, wherein the nozzle hole has a bicircular exit shape.

9. The nozzle plate of claim 6, wherein the transverse axis dimension ranges from about 0 to about 7 microns less than the first width of the fluid chamber.

10. A micro-fluid ejection head comprising the nozzle plate of claim 6.

11. A method for reducing processing time for ablating a nozzle plate material to provide flow feature structures therein, the method comprising the steps of:

laser ablating an elongate ink chamber and a fluid supply channel for the ink chamber in the nozzle plate material partially through a partial thickness of the nozzle plate material, the ink chamber having a first length and a first width;

subsequently, laser ablating a nozzle hole axially aligned with the first length of the ink chamber through a remaining thickness of the nozzle plate material, the nozzle hole having a nozzle hole entrance having a longitudinal axis dimension and a transverse axis dimension, wherein the transverse axis dimension is less than or equal to the first width and wherein the longitudinal axis dimension ranges from about two to about six microns shorter than the first length of the fluid chamber.

12. The method of claim 11, wherein a number of laser-pulses required for making the flow feature structures is less than a number of pulses required for making the flow feature structures when the fluid chamber and fluid supply channel are ablated subsequent to ablating the nozzle hole.

13. The method of claim 11, wherein the transverse axis dimension ranges from about 0 to about 7 microns less than the first width of the fluid chamber.

14. The method of claim 11, wherein the nozzle hole has a bicircular exit shape.

15. The method of claim 11, wherein the first width is an entrance width of the ink chamber and the first length is an exit length of the ink chamber.

16. A micro-fluid ejection head comprising the nozzle plate of claim 11.

17. The micro-fluid head of claim 16, wherein the nozzle plate has a nozzle pitch of greater than 600 dpi and wherein adjacent nozzles and corresponding ink chambers are not offset in a direction orthogonal to a fluid feed slot.

* * * * *